(12) United States Patent
Wigboldy et al.

(10) Patent No.: US 11,078,664 B1
(45) Date of Patent: Aug. 3, 2021

(54) APPARATUSES FOR MOUNTING AND SUPPORTING INSULATION

(71) Applicant: Rodenhouse, Inc., Grand Rapids, MI (US)

(72) Inventors: Jason R. Wigboldy, Grand Rapids, MI (US); Mitchell B. Mahler, Grand Rapids, MI (US)

(73) Assignee: Altenloh, Brinck & Co. US, Inc., Bryan, OH (US)

( * ) Notice: Subject to any disclaimer, the term of this patent is extended or adjusted under 35 U.S.C. 154(b) by 0 days.

(21) Appl. No.: 16/704,756

(22) Filed: Dec. 5, 2019

Related U.S. Application Data

(60) Provisional application No. 62/775,483, filed on Dec. 5, 2018, provisional application No. 62/838,418, filed on Apr. 25, 2019.

(51) Int. Cl.
*E04B 1/76* (2006.01)
(52) U.S. Cl.
CPC .................. *E04B 1/7629* (2013.01)
(58) Field of Classification Search
CPC .................................................. E04B 1/7629
See application file for complete search history.

(56) References Cited

U.S. PATENT DOCUMENTS

| | | | | |
|---|---|---|---|---|
| 4,512,130 A * | 4/1985 | Pepin | ................... | E04B 1/7666 411/466 |
| 5,060,441 A * | 10/1991 | Pichette | ................. | E04B 2/762 52/404.2 |
| 5,299,403 A * | 4/1994 | Fentz | ................... | E04B 1/7629 52/379 |
| 8,029,223 B2 * | 10/2011 | Mair | ..................... | F16B 43/001 411/542 |

* cited by examiner

*Primary Examiner* — Patrick J Maestri
(74) *Attorney, Agent, or Firm* — Gardner, Linn, Burkhart & Ondersma LLP (57) ABSTRACT

A hanger apparatus is provided for attaching and securing building materials to a structure, such as attaching fibrous insulation to a wall or a cladding system on a building. The hanger includes a selectively deployable securing element such as a bendable barb to impale the building material and to secure the impaled building material to the hanger. The hanger may include a sealing fastener to secure the apparatus to the structure and to form a air, vapor, or weather seal between the fastener, hanger apparatus, and structure. The hanger is configurable for use with a single securing element or may be interlocked with additional hangers to create a chain of securing elements to secure a large portion of building material to a large section of a building. The hanger may include relief notches or apertures to reduce the force required to bend portions of the apparatus.

12 Claims, 7 Drawing Sheets

APPARATUSES FOR MOUNTING AND SUPPORTING INSULATION

CROSS REFERENCE TO RELATED APPLICATIONS

The present application claims priority of U.S. provisional applications Ser. No. 62/775,483 filed Dec. 5, 2018 and Ser. No. 62/838,418 filed Apr. 25, 2019, which are both hereby incorporated herein by reference in their entireties.

FIELD OF THE INVENTION

The present invention is directed to apparatuses for securing insulation to a building, specifically for securing batt insulation such as mineral wool insulation to a wall or cladding system during the construction of a building.

BACKGROUND OF THE INVENTION

Fibrous insulation is common for insulating buildings, especially buildings utilizing glass cladding systems. Stick pins are often used to mount fibrous insulation such as mineral wool insulation on buildings during construction. Stick pins typically use adhesive to secure the stick pins to other building materials.

SUMMARY OF THE INVENTION

The present invention provides hanger apparatuses for securing a building material such as fibrous insulation or fire safing, and in particular mineral wool insulation, to a structural frame or a building surface with minimal labor, material and energy efficiency costs. In a first constructional embodiment, the hanger apparatus may be a barbed strap comprising a main body and a single barb for impaling a portion of insulation, such that the insulation is engaged by the single barb to maintain the insulation on the barb. The barb of the hanger apparatus is sufficiently bendable to allow the barb to be deployed or bent out from the hanger apparatus main body to impale a portion of insulation. Wherein the barb is bendable to secure the insulation to the hanger apparatus to secure the insulation in position during installation. The hanger apparatus may be configured to be mechanically attached to concrete, metal, wood, other insulations, or other structural elements. The hanger apparatus may be a chain of at least two barbed straps hung from a vertical location such that the at least two barbed straps are interlocked. The hanger apparatus provides a minimal number of fasteners to reduce thermal-bridging & air-barrier penetrations to increase energy efficiency of the insulation.

The hanger apparatus is provided for securing fibrous mineral wool insulation during installation of the insulation in a building includes a main hanger body and a selectively bendable elongate securing element or barb. The main hanger body is configured to mechanically attach to a portion of a building and to support the securing barb. The securing barb is configured to engage the insulation by impaling a portion of the insulation, such that the barb passes through the insulation and extends beyond a back face of the insulation. The barb may be stamped from the main body of the hanger apparatus and the main body and the barb include have at least a portion of material in common with each other. The barb is configured to bend about the common material while retaining connection with the main body at the common material. Optionally, the hanger apparatus may be disposed substantially entirely proximate a wall stud location, or the hanger apparatus may be fastened at one end at a stud location and a remainder of the hanger apparatus may be angled away from the stud such that the barb is located between stud locations to secure insulation to the structure from a location without adequate structural support for the entire hanger apparatus.

In one aspect, the barb is able to be bent toward the back face of the insulation to secure the insulation to the hanger body and thus securing the insulation to the building or corresponding structure. The barb may remain in an undeployed configuration such that the hanger apparatus is substantially flat on the building surface after the hanger apparatus has been installed on the structure. The barb may be deployed or bent away from the main body of the apparatus when it is required to secure the insulation during installation of the insulation. Optionally, the securing barb includes additional features such as a rib along a portion of the barb to stiffen the barb, relief holes or apertures to aid in bending the barb, and a stop or protrusion to limit the angle at which the barb may be bent.

In one aspect of the present invention, a single barb is disposed on a hanger body, and the hanger body is configured to mount onto a cladding system of a building. The hanger body including angles adapted to match the form of the cladding system. Optionally, notches or relief cuts are provided along the hanger body to aid a user in bending or forming the hanger body to fit onto a cladding system or wall structure, such as into a corner of a cladding system frame.

In another aspect of the present invention, a stiffening rib is provided along the securing element to provide additional structural strength to the securing element. The hanger apparatus may include a limit stop proximate the material in common between the securing element and the main hanger body. The limit stop limits the deployment angle of the securing element to indicate that the securing element has been fully deployed or deployed to a maximum angle. In another aspect, the securing element includes a plurality of relief holes or apertures in spaced arrangement along the securing element. The relief holes reduce the amount of force that is required to bend the securing element proximate a corresponding one of the relief holes to allow a user to bend the securing element. The location of the spaced relief holes is chosen to accommodate incrementally different sizes of insulation that may be installed on the structure.

A single barb may be disposed on a substantially flat hanger body, such that the flat hanger body may be mechanically attached to a flat surface such as a wall to secure a portion of insulation to the flat surface. The flat hanger body is additionally capable of being pre-installed onto a portion of insulation such that the pre-assembly of the hanger and the insulation is installed with the outer face of the insulation flush with the outer face of the frame. The flat hanger body is mechanically attached to the outside face of a frame.

In one aspect of the current invention, the hanger apparatus includes a sealing fastener with a gasket or seal for securing the hanger to the wall or cladding system of the structure in a sealed manner. The gasket provides a seal between the fastener and the wall or cladding system to seal against vapor, fluid, or weather transmission between the fastener and the wall or cladding system. The outer diameter of the seal is chosen such that it is substantially equal to or slightly smaller than the inside the diameter of a mounting hole that is disposed through the main body of the hanger apparatus. The seal may nest inside of the mounting hole prior to installation of the hanger apparatus onto the structure. A fluid, air, vapor, or weather barrier may be located between the insulation and the wall or cladding system, wherein the sealed fastener provides a seal with the vapor barrier to provide a fluid or vapor barrier seal, such that fluid or vapor is inhibited from leaking between the fastener and the barrier.

According to another constructional embodiment of the invention, a plurality of securing barbs may be disposed on a single hanger body. In another aspect, each hanger body is capable of interlocking with an additional hanger body to create a chain of securing barbs. One end of the hanger body includes a receiving opening that is configured to receive a tab that is disposed on the end of the hanger body opposing the receiver opening. The tab end of the hanger body engages the receiving opening forming an interlock between two hanger bodies, thus creating a chain of multiple hanger bodies.

Therefore, the present invention provides hanger apparatuses for simply securing a portion of a building material such as insulation to a structure during construction and the life of the building material. The hanger apparatuses are configurable to different structural requirements. These and other objects, advantages, purposes, and features of the present invention will become more apparent upon review of the following specification in conjunction with the drawings.

DESCRIPTION OF THE PREFERRED EMBODIMENTS

Figure 1:
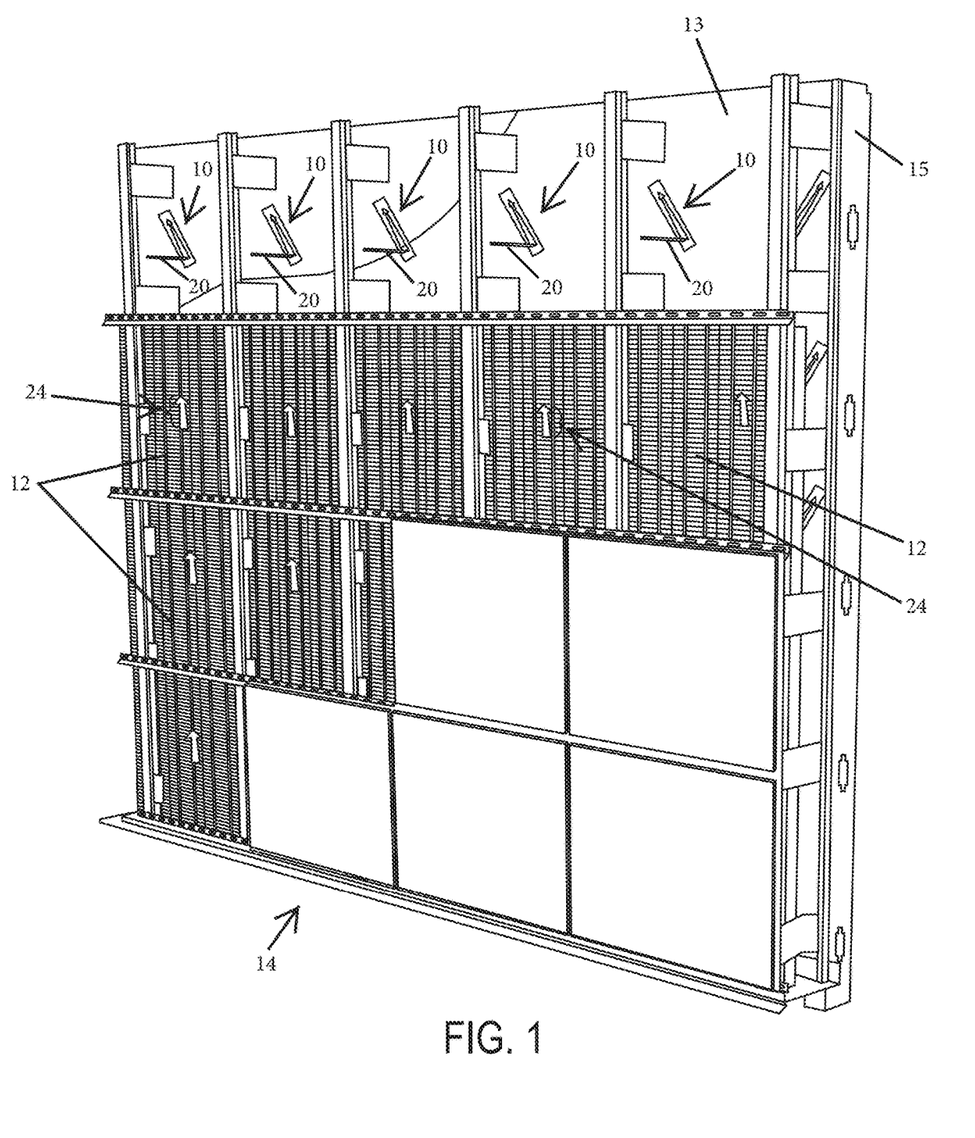
FIG. 1 is a perspective view of a wall utilizing an insulation hanging apparatus to secure insulation onto the wall in accordance with the present invention.
Figure 2:
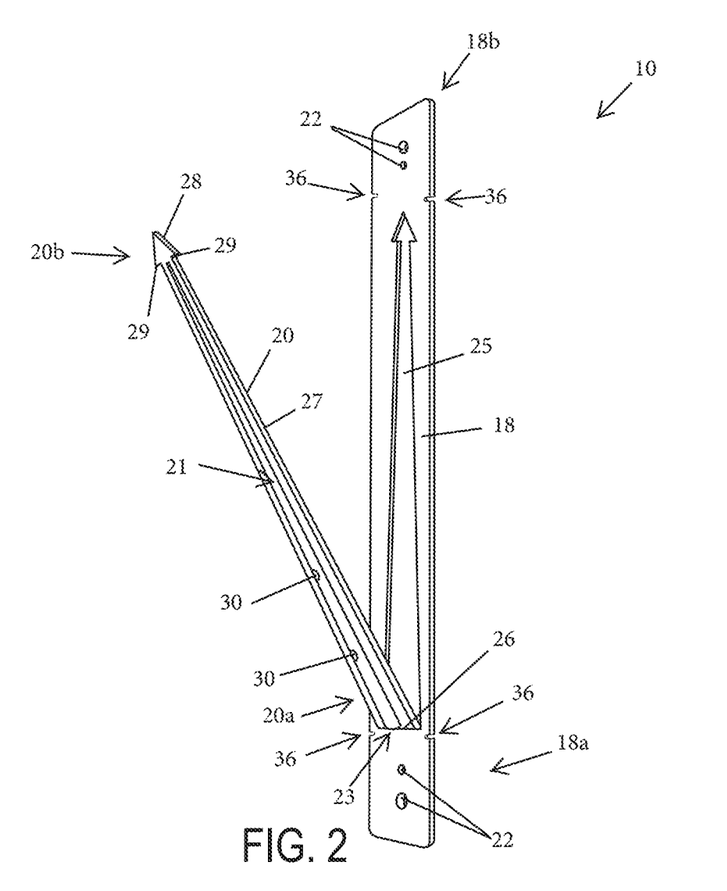
FIG. 2 is a perspective view of an insulation hanging apparatus in accordance with the present invention having a partially deployed securing element.

Referring now to the drawings and the illustrative embodiments depicted therein, a hanger apparatus or barbed strap 10 is provided for securing and supporting a portion or section of construction material, and in particular batt type insulation, such as a section of mineral wool insulation 12, to a building or portion of a structure (FIGS. 1 and 2). The barbed strap 10 provides a quick, simple, safe, and cost-effective attachment system for securing material during construction of a building, such as securing fibrous insulation 12 to a wall 14 or cladding system 16 (FIG. 1). The barbed strap 10 includes a main strap body 18 that may be formed from a single piece of material and includes a securing element 20, constructed as a bendable hanger or prong, such as a barb, tab, hook, or similar shape, coupled to the strap body 18. The main strap body 18 includes various mounting holes or apertures 22 to accept mechanical fasteners that permanently secure the barbed strap 10 to the structure. As shown in the illustrated embodiment, the holes 22 are located at the top and bottom or ends of the body 18 and include holes 22 of differing diameter whereby differently sized fasteners may be used to secure the strap 10 to a wall fixture, such as a nail or threaded fastener. The barbed strap 10 is made from a malleable material, such as steel, aluminum or any material that is able to be bent into a different shape and substantially retain that shape while also maintaining structural strength sufficient to support and secure a section of insulation.

Figure 3A:
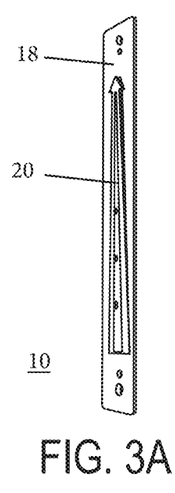
FIG. 3A-3D are perspective views of the apparatus of FIG. 2 depicting sequential steps of deployment of the securing element.
Figures 3B, 3C:
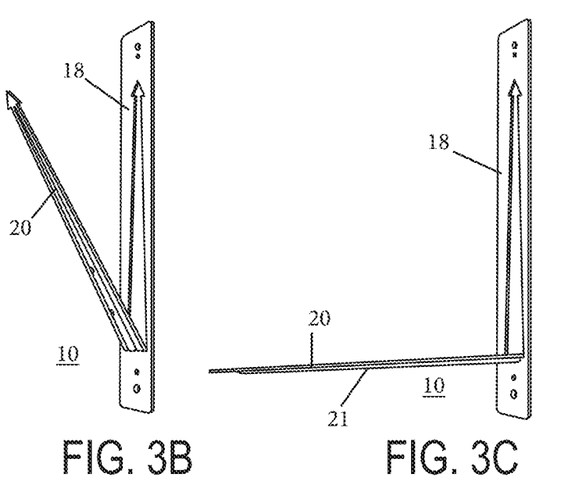
Figure 3D:
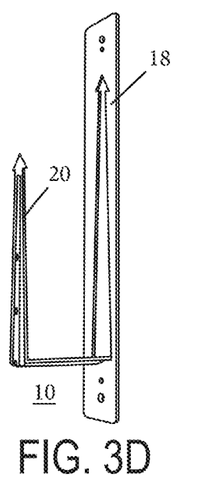

In the illustrated embodiments of FIGS. 2-3D, a barbed strap hanger apparatus 10 includes a main strap body 18 and a single arm or securing element 20 coupled to the strap body 18 proximate a lower end 18a of the body 18. Body 18 is substantially flat and elongated with a longitudinal axis corresponding to the longitudinal axis of securing element 20. The securing element 20 is selectively bendable to bend away from the strap body 18 to receive the section of material to be impaled, or penetrated by the securing element 20 (FIGS. 3-6). In the illustrated embodiment the securing element 20 is stamped from the body 18 of the barbed strap 10 and the securing element 20 is substantially defined by a cutout or opening 25 from the main strap body 18, the cutout 25 defining a majority of the perimeter of the securing element 20 (FIG. 2). In particular, the apparatus 10 may be formed by stamping from a sheet gauge material, whereby the body 18 is substantially flat. Alternatively, however, an apparatus in accordance with the present invention may be formed by a molding operation. Moreover, although a single securing element 20 is shown, it should be appreciated that a strap 10 may be provided with two or more such securing elements 20. For example, an alternative body having a greater width may be provided with two stamped out arms or securing elements.

The securing element 20 is coupled to the body 18 of the barbed strap 10 by a continuous connection 26 between the body 18 and a proximal end 20a of the securing element 20. The connection 26 forms a bendable hinge between the securing element 20 and the body 18. In the illustrated embodiment the securing element 20 forms an elongated shaft 27 having a longitudinal axis that extends with the longitudinal axis of the body 18 when the securing element 20 is in the orientation of FIG. 3A. The distal end 20b of the securing element 20 includes a retainer element 28 configured as a pointed tip that retains the impaled insulation 12 to or on the securing element 20 (FIGS. 2, 5-6, and 10). In the illustrated embodiments, the retaining element 28 includes teeth or barbs 29 to impede the impaled insulation 12 from sliding of the securing element 20. The pointed tip 28 thus penetrates through insulation 12 when installed thereon and inhibits the insulation 12 from being removed therefrom. The shaft 27 and distal end 20b of the securing element 20 are thus moveable or deployable away from the main strap body 18 by bending along hinge 26. The securing element 20 can be left in the un-deployed, unbent position relative to the strap body 18 when the securing element 20 is not in use to secure the building material 12, such as after installation of the hanger 10 and before the insulation 12 is to be installed. That is, apparatus 10 is produced, such as by stamping and drilling, and provided to a user in the orientation of FIG. 3A, where the user is then able to mount the apparatus 10, as discussed in more detail below, and subsequently bend the securing element 20 as needed to install insulation 12.

Prior to installation of the insulation 12, and after the apparatus 10 has been mounted to a wall, the securing element 20 is deployed or bent away from the strap body 18 (FIGS. 3A-3D). The securing element 20 is depicted in sequential steps of deployment in FIGS. 3A-3D. The securing element is pulled out from the main body 18 (FIGS. 3A-3B), until it reaches a substantially ninety degree angle relative to the main body 18 (FIG. 3C). FIG. 3D illustrates the deployed securing element 20 further bent at a location along the securing element 20, the further bent location is selected as a function of the thickness of the insulation 12 to be secured onto the hanger apparatus 10. The securing element 20 may be returned to the un-deployed position if the securing element 20 is not yet needed for installation of the insulation 12 by reversing the steps of deployment depicted in FIGS. 3A-3D. The securing element 20 may be left in the un-deployed or substantially flat configuration (FIG. 3A) for safety reasons until the securing element 20 is required to secure the insulation 12 during installation of the insulation 12.

Figure 6:
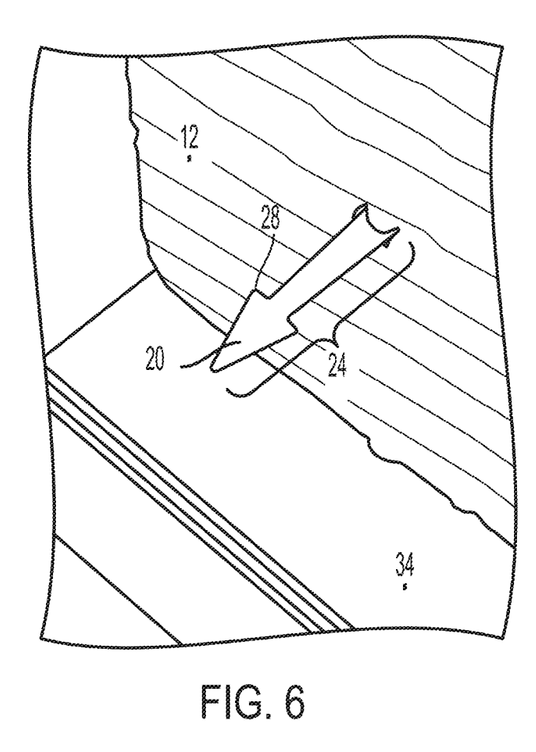
FIG. 6 is another perspective view of the apparatus of FIG. 5 with a section of mineral wool insulation installed within the wall and impaled on the securing element.
Figure 7:
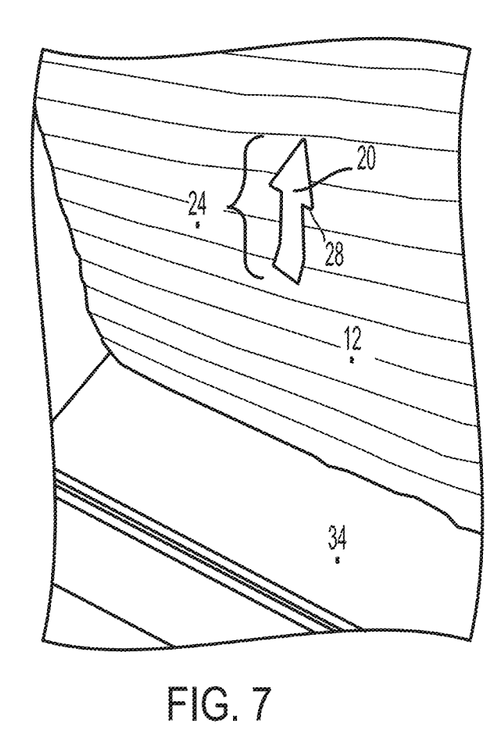
FIG. 7 is another perspective view of the apparatus of FIG. 6 illustrating the securing element folded against and securing the mineral wool insulation.
Figure 10:
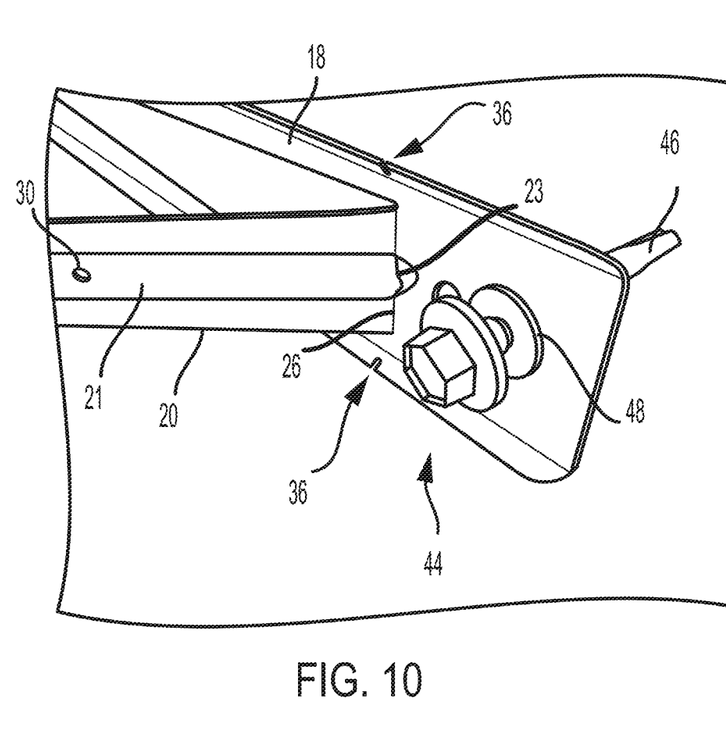
FIG. 10 is a perspective view of another insulation hanging apparatus for securing insulation to a wall during construction in accordance with the present invention, having sealing fasteners disposed at upper and lower portions of the apparatus and a deployed securing element.

During installation of the insulation 12, the insulation 12 is impaled onto the securing element 20 (FIG. 6). An exposed portion 24 of the securing element 20 that penetrates through the front face, the entire thickness of the section, and the back face of the material is then bent toward the back face of the material to secure the material onto the securing element 20 (FIG. 7). As illustrated in FIGS. 2, 3, and 10, relief holes or apertures 30 may be provided in the securing element 20 to reduce material at a portion of the securing element 20 to reduce the force required to adjust or bend the exposed portion 24 of the securing element 20 proximate a corresponding aperture 30 to secure the material onto the securing element 20.

The apertures 30 may be spaced at various increments along the securing element 20 starting from an initial distance proximate the proximal end 20a of the securing element 20 to provide convenient bending to accommodate different thicknesses of mineral wool insulation (FIGS. 2-3D). Mineral wool insulation is typically manufactured in thickness increments of ½ inch, such as 2 inch thick, 2½ inch thick, and 3 inch thick insulation. Accordingly, the apertures 30 may be spaced at 2⅛ inch, 2⅝ inch, and 3⅛ inch from the base of securing element 20, with an additional ⅛ inch provided at each increment to accommodate bending tolerances and insulation thickness tolerances. Strap 10 may also be employed for use with thicker insulation, such as 6 inch insulation, with the distal end 20b of securing element 20 being readily bent to retain the insulation 12.

In the illustrated embodiments of FIGS. 2-3D and 10-11, a stiffener 21, such as a rib, is disposed along a portion of the securing element 20 to provide additional stiffness to the securing element 20. The rib 21 is formed by deforming a portion of the shaft 27, such as by stamping a U-shaped groove into shaft 27 along the elongate length of the shaft 27, where rib 21 in the illustrated embodiment has an outwardly convex shape relative to the front orientation of FIG. 2 and a convex shape relative to the opposite back side of shaft 27. A limit stop or tab 23 is disposed at a lower portion of the securing element 20. The limit stop 23 provides a stop to limit the angle at which the securing element 20 may be bent relative to the body 18 of the strap 10, where stop 23 may be formed by a lower portion of rib 21. The limit stop 23 may be configured to limit the maximum angle of the securing element 20 to about ninety degrees or at about a right angle relative to the body 18. As the securing element 20 is bent away from the body 18 and approaches the maximum angle, the limit stop 23 contacts a portion of the body 18 to limit further bending of the securing element 20.

Figure 4:
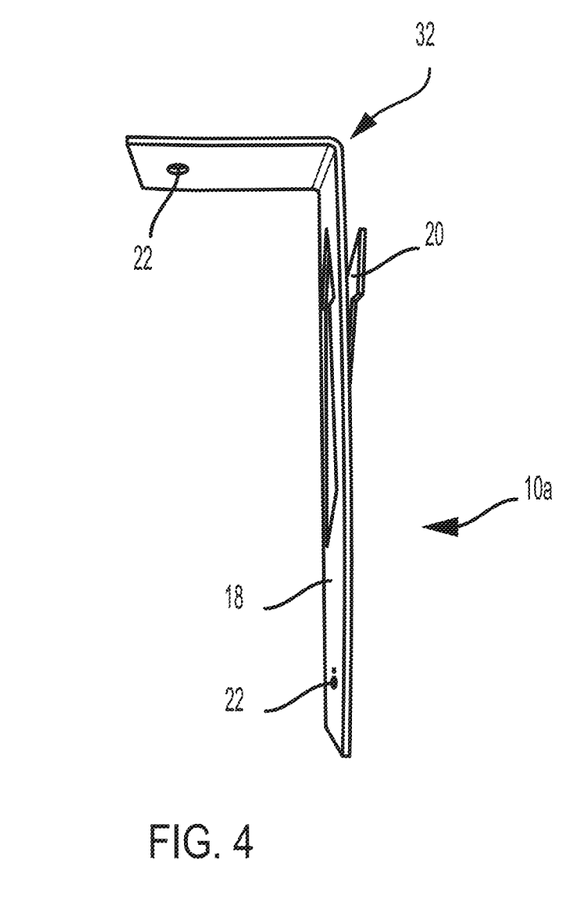
FIG. 4 is a perspective view of another insulation hanging apparatus in accordance with the present invention for mounting in a location that will be covered by the insulation, having a securing element in an un-deployed position.
Figure 5:
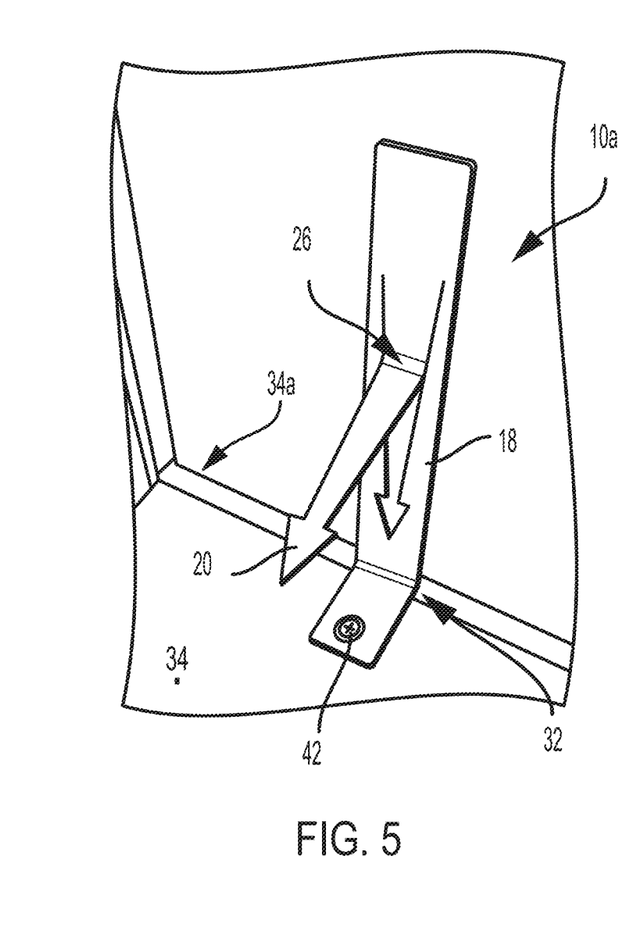
FIG. 5 is a perspective view of the apparatus of FIG. 4 installed within a wall and having a deployed securing element.

In the illustrated embodiments of FIGS. 4 and 5, an angled barbed strap hanger apparatus 10a includes an angled portion 32 to attach the barbed strap 10 to a corner section of a frame 34 or other structure. The hanger 10a may be pre-formed or bent with the angled portion 32 at either end of the hanger body 18 or the hanger 10a may be bent by a technician or installer when the frame 34 or structure requires a hanger apparatus 10a at a corner section. As illustrated in FIGS. 2 and 10, relief slits or notches 36 may be disposed on the hanger apparatus 10a to reduce material at a portion of the strap 10 to reduce the force required to adjust or bend the strap 10 to accommodate installation on corner sections of a wall system 12, such as at a frame 34 of a wall system 12 as illustrated in FIGS. 5-7.

Figure 8:
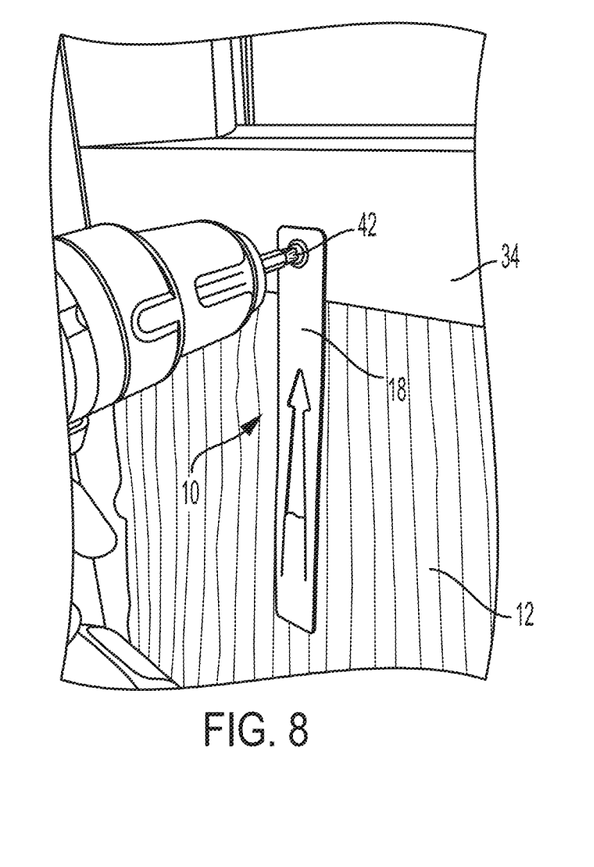
FIG. 8 is a perspective view of another insulation hanging apparatus in accordance with the present invention and shown configured for pre-installation to a wall prior to installation of insulation, wherein the apparatus is secured to a top frame.
Figure 9:
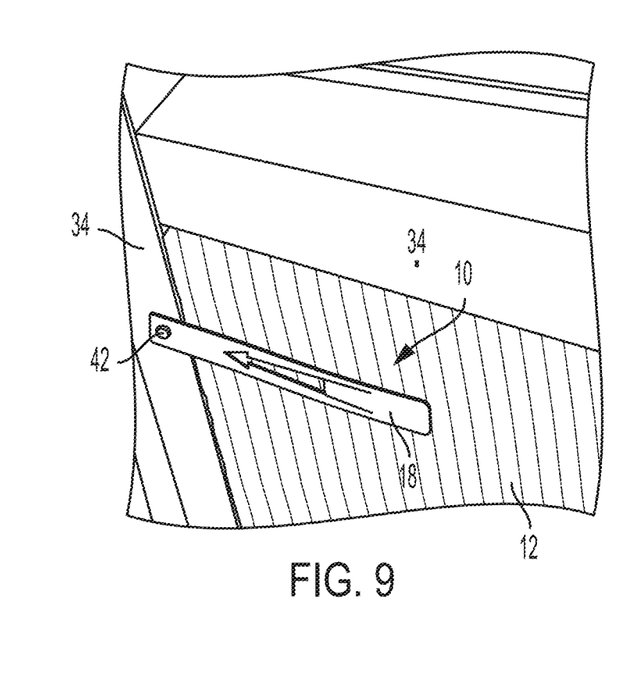
FIG. 9 is another perspective view of the apparatus of FIG. 8 secured to a side frame.

The barbed strap 10 may be configured to be pre-installed into a section of material, fire safing (not shown), or insulation 12, such that the strap 10 and the fire safing or insulation 12 may be installed at the same time, where the strap 10 is to be mechanically attached to a frame 34 to secure the strap 10 and the insulation 12 to the frame 34 (FIGS. 8 and 9). The barbed strap 10 may be configured to secure insulation 12 onto or against concrete walls or steel columns (not shown). The barbed strap 10 may be configured to mount insulation to glass curtain wall systems 16 and to fire perimeter safing systems (FIGS. 4-9). The barbed strap 10 may be installed upright, or sideways, depending of the space constraints within the structure to which the strap 10 is mounted. As illustrated in FIG. 1, the barbed strap 10 may be mounted diagonally on a surface of a structure to provide adequate support for the insulation 12 when the wall does not provide a continuous substrate or a sufficiently strong attachment point to attach the barbed strap 10 proximate the location that the insulation 12 needs to be supported. An example of such an occasion includes a gypsum substrate 13 mounted to a wood stud 15 (not visible in FIG. 1). The insulation 12 may require support at a location between studs 15 and the substrate 13 is not sufficiently strong to support a mechanical fastener to secure the barbed strap 10 to the wall 14. As such, one end of the barbed strap 10 may be mechanically fastened at a location of a stud 15 and the barbed strap 10 is angled diagonally such that the securing element 20 is located proximate a space between two studs 15.

The barbed strap 10 is mechanically fastened to a structure using fasteners such as screws 42 through pre-drilled holes 22 (FIGS. 5, and 8-9). While the illustrated embodiments of FIGS. 5, and 8-9 show the mechanical fastener as a Philips head screw 42, other mechanical fasteners may be used to secure the barbed strap 10 to a structure, including concrete anchors, rivets, welds, or bolts.

Figure 11:
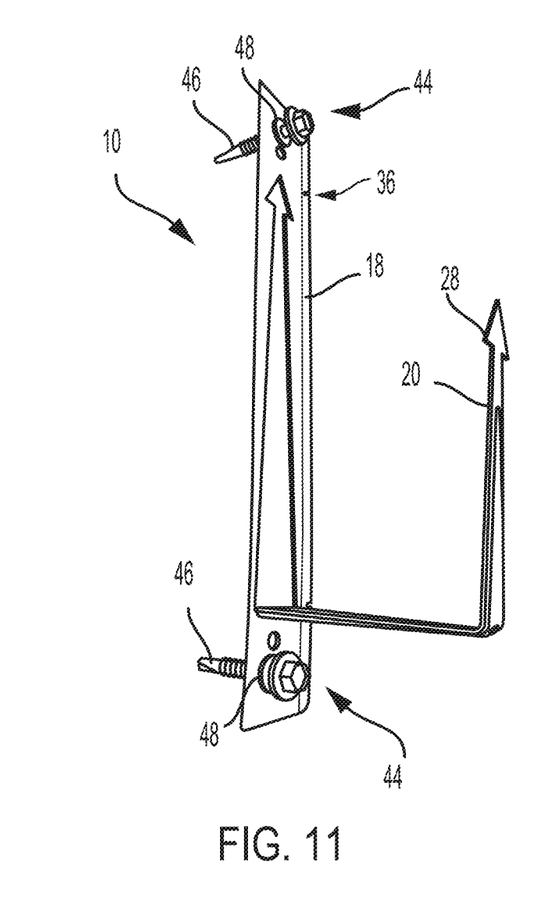
FIG. 11 is an enlarged perspective view of a portion of the apparatus of FIG. 10 with a detailed view of one of the sealing fasteners.

In the illustrated embodiments of FIGS. 10 and 11, the hanger apparatus 10 includes a sealing fastener 44 for securing the hanger 10 to the wall 14 or cladding system 16 of the structure. The sealing fastener 44 includes a screw 46, such as a self-starting flat head screw, and a seal configured as a gasket or bushing 48. The seal bushing or gasket 48 provides a seal between the screw 46, the hanger 10, and the wall 14 or cladding system 16 to seal against vapor, fluid, air or other weather transmission between the screw 46, the hanger 10, and the wall 14 or cladding system 16. The gasket 48 is formed of a semi-rigid material and defines a center bore (not shown) extending along the length of the gasket 48 to receive the screw 46. The gasket 48 dimensions are selected such that the outer diameter of the gasket 62 is substantially equal to or slightly smaller than the diameter of the mounting hole 22 disposed in the hanger 10, such that the un-compressed seal gasket 48 can nest inside of the mounting hole 22. The head of the screw 46 is dimensioned such that it is larger than the diameter of the mounting hole 22 and that the head of the screw 46 retains the hanger 10 against the structure or wall 14. As such, when the screw 46 is tightened, the seal 48 is compressed between the head of the screw 46 and the wall 14 or cladding system 16 causing the gasket 48 to expand inside of and contact the mounting hole 22 of the hanger 10 and the building surface proximate the gasket 48 to form a seal between the screw 46, the mounting hole 22, and the wall 14 or cladding system 16.

A fluid, air, vapor, or weather barrier (not shown) may be disposed between the insulation 12 and the wall 14 or cladding system 16, wherein when the screw 46 is tightened the gasket seal 48 is compressed between the head of the screw 46 and the vapor barrier causing the gasket 48 to expand inside and contact the mounting hole 22 of the hanger 10 to form a seal between the screw 46, the mounting hole 22, and the fluid or vapor barrier seal, such that fluid or vapor leakage between the fastener and the fluid, air, vapor, or weather barrier, is reduced or eliminated, thereby reducing energy transfer through the barrier. The seal 48 thus aids in sealing against air, water and vapor into the structure or through a weather vapor barrier.

Figure 12:
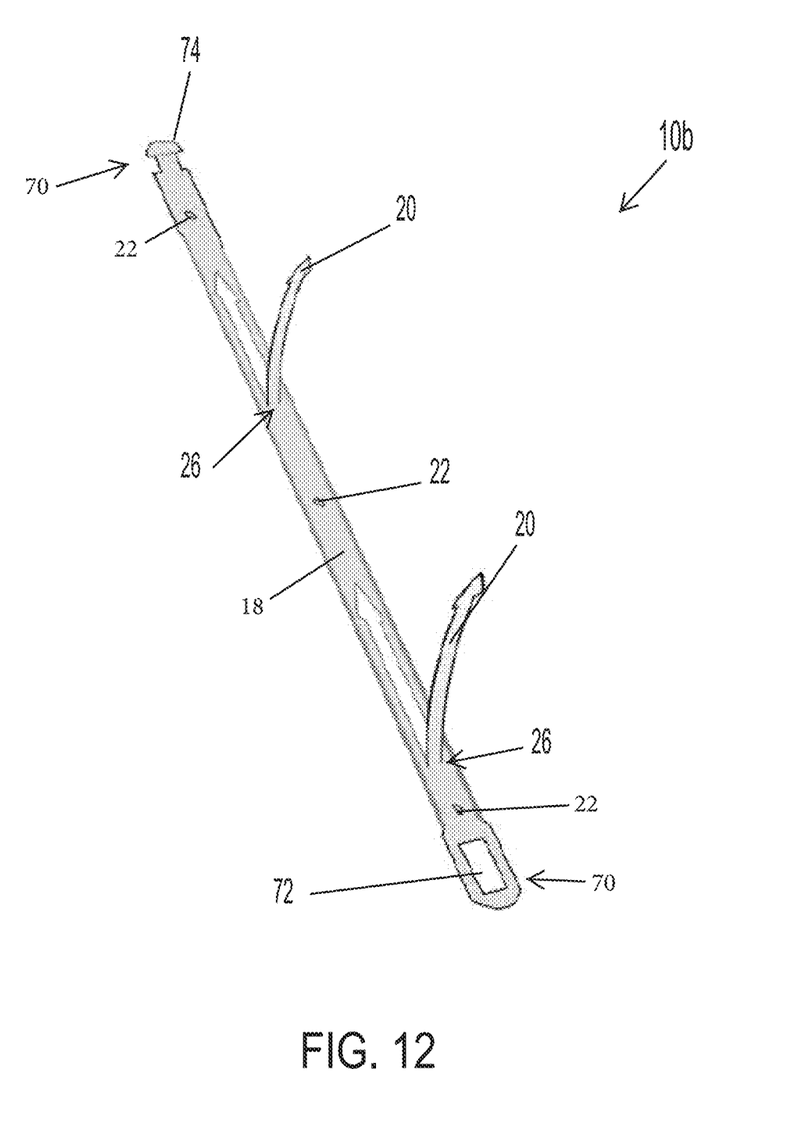
FIG. 12 is a perspective view of an interconnectable insulation hanging apparatus in accordance with the present invention, having splicing or interlocking connectors or ends to connect a plurality of the apparatuses together, the apparatus illustrated with deployed securing elements.

In the illustrated embodiment of FIG. 12, an interconnectable barbed strap hanger apparatus 10b is configured to hang from an elevated location, wherein the barbed strap 10b may include an end to end interlocking system 70 at the ends of the barbed strap to "string together" multiple similarly configured barb straps to extend the entire height of a wall, forming a "chain" or "string" (not shown) of barbed straps 10b. One end of a barbed strap 10b may include a receiving opening 72 configured to receive a tab 74 disposed on the end of the barbed strap 10b opposing the opening 72. The tab 74 engages the opening 72 to interlock two or more barbed straps 10b together. The top barbed strap 10b of the chain may be mechanically fastened at the top plate, cap, or rail of stud wall, with additional barbed straps 10b interlocked in one line and hanging from the top strap 10b (not shown). The bottom end of the lowest barbed strap 10b on the chain is mechanically fastened to the bottom plate of the stud wall 14. The barbed strap 10b can be hung "between" stud locations and cladding attachment systems such as Cascadia Clip or KnightwallMFI.

Accordingly, the hanger apparatus of the present invention provides a simple and fast attachment point for a building material such as fibrous insulation. The hanger apparatus provides an adequate support and security for the building material during installation of the building material and provides for less potential air leaks due to punctures through the building material. The hanger apparatus provides a configurable hanger for quickly securing building materials based on different conditions and requirements of a structure and thickness of the building material. The hanger apparatus may be installed with a securing element in an un-deployed or substantially flat configuration until the securing element is required to support the building material. During installation of the building material the securing element can be deployed to impale the building material. An exposed portion of the securing element can then be bent or configured to retain the building material onto the hanger apparatus.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A hanger apparatus for securing insulation to a wall structure of a building, said hanger apparatus comprising:
   a main body configured to be mounted to a wall structure;
   a hanger arm movably connected to said main body, said hanger arm including an end having a tip;
   wherein said tip of said hanger arm is configured to penetrate insulation for retention of the insulation on the wall structure, wherein said hanger arm is connected to said main body at a hinge, wherein said hanger arm comprises an elongate member with said hinge comprising one end of said hanger arm and said tip comprising an opposite end of said hanger arm, wherein said hanger arm is bendable along the length of said hanger arm between said tip and said hinge and wherein said hanger arm further comprises a plurality of relief holes disposed in spaced arrangement along said hanger arm configured to reduce the force required to bend said hanger arm.

2. The hanger apparatus of claim 1, wherein said main body and said hanger arm are integrally formed from the same material, and wherein said hinge comprises a bendable connection of said hanger arm with said main body.

3. The hanger apparatus of claim 1, wherein said hanger arm comprises a shaft with said tip connected to said shaft, and wherein said tip includes a pointed head having barbs extending beyond a width of said shaft at the connection of said shaft with said tip.

4. A hanger apparatus for securing a portion of building material for a structure, said hanger apparatus comprising:
   a main hanger body for supporting the portion of building material; and
   a securing element disposed on said main body, said securing element is selectively deployable and configured to engage the portion of building material to secure it to said main body; and
   wherein said main body is configured to mechanically attach to the structure to secure the building material to the structure, wherein said securing element is an elongate shaft configured to impale a fibrous insulation building material, wherein said shaft is stamped from a portion of said main body such that a perimeter of said shaft is free to selectively move relative to said main body, said shaft having at least a portion of material in common with said main body, wherein said shaft is sufficiently long to impale the portion of fibrous insulation through a front face and a back face, such that a remaining portion of said shaft extends beyond the back face, wherein said remaining portion of said shaft is selectively bendable towards the back face of the fibrous insulation to form a securing hook to secure the fibrous insulation to said barb, and wherein said shaft further comprises a plurality of relief holes disposed in spaced arrangement along said shaft configured to reduce the force required to bend said shaft toward the back face of the fibrous insulation.

5. The hanger apparatus of claim 4, wherein said main body and said securing element comprise a malleable material having properties such that the material is selectively bendable to a different shape, is substantially capable of maintaining said bent shape, and maintains sufficient structural strength to secure the portion of building material.

6. The hanger apparatus of claim 4, wherein said shaft further comprises a stiffening rib disposed along a portion of said shaft.

7. The hanger apparatus of claim 6, wherein said stiffening rib further comprises a limit stop disposed at a lower portion of said shaft proximate said portion of material in common with said main body, said limit stop configured to limit the deployment angle of said shaft.

8. The hanger apparatus of claim 4, further comprising relief cutouts disposed at at least one of an upper portion of said main body and a lower portion of said main body, said relief cutouts configured to reduce the force required to bend said hanger apparatus proximate said relief cuts to facilitate installation on the structure.

9. The hanger apparatus of claim 4, further comprising a sealing fastener disposed in said hanger apparatus and configured to secure said apparatus to the structure, wherein said sealing fastener further comprises a screw and a seal bushing formed of a semi-rigid material, wherein the seal bushing has a thickness that is greater than a thickness of said main body and wherein the seal bushing is disposed within a mounting hole of said main body, and wherein said seal bushing defines a center bore configured for receiving the screw, wherein said seal bushing is configured such that as the screw is tightened the seal bushing is compressed between an underside of a head of the screw and the structure within the mounting hole.

10. The hanger apparatus of claim 4, wherein said hanger apparatus is configured to interconnect with another of said hanger apparatus to define a chain of said hanger apparatuses.

11. A hanger apparatus for hanging and securing a portion of fibrous insulation to be installed on a structure, said hanger apparatus comprising:
   a main hanger body configured to mechanically attach to the structure to secure the insulation to the structure; and
   a securing element disposed on said main body and configured to selectively engage the portion of insulation to secure it to said main body;
   wherein said main body and said securing element are formed from the same malleable material, the malleable material having properties such that it is bendable to a different shape, is substantially capable of maintaining said bent shape, and maintains sufficient structural strength to secure the portion of insulation;
   wherein said securing element is sufficiently long to impale the portion of insulation through a front face and a back face, such that a remaining portion of said securing element extends beyond the back face; and
   wherein said remaining portion of said securing element is selectively bendable towards the back face of the insulation to form a securing hook to secure the insulation to said securing element;
   wherein said securing element comprises a plurality of relief holes disposed in spaced arrangement along said securing element configured to reduce the force required to bend said securing element toward the back face of the insulation.

12. The hanger apparatus of claim 11, wherein said securing element is stamped from a portion of said main body such that a perimeter of said securing element is free to selectively move relative to said main body, said securing element having at least a portion of material in continuous communication with said main body.

\* \* \* \* \*